(12) United States Patent
Sugeno et al.

(10) Patent No.: US 10,951,038 B2
(45) Date of Patent: Mar. 16, 2021

(54) POWER SUPPLY DEVICE, POWER SUPPLY SYSTEM, AND METHOD OF CONTROLLING POWER SUPPLY

(71) Applicant: Murata Manufacturing Co., Ltd., Kyoto (JP)

(72) Inventors: Naoyuki Sugeno, Fukushima (JP); Shun Nagashima, Fukushima (JP); Shunichi Nihei, Fukushima (JP); Atsushi Chinen, Fukushima (JP); Masami Okada, Fukushima (JP); Atsushi Minami, Fukushima (JP); Kazumi Sato, Tokyo (JP); Hiroaki Yoshida, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 662 days.

(21) Appl. No.: 15/022,140

(22) PCT Filed: Dec. 16, 2014

(86) PCT No.: PCT/JP2014/006240
§ 371 (c)(1),
(2) Date: Mar. 15, 2016

(87) PCT Pub. No.: WO2015/098034
PCT Pub. Date: Jul. 2, 2015

(65) Prior Publication Data
US 2016/0226255 A1 Aug. 4, 2016

(30) Foreign Application Priority Data
Dec. 27, 2013 (JP) .............................. JP2013-272777

(51) Int. Cl.
*H02J 9/00* (2006.01)
*H02J 3/38* (2006.01)
(Continued)

(52) U.S. Cl.
CPC ................ *H02J 3/383* (2013.01); *H02J 3/14* (2013.01); *H02J 3/32* (2013.01); *H02J 3/386* (2013.01);
(Continued)

(58) Field of Classification Search
CPC ...... H02J 3/14; H02J 3/32; H02J 3/383; H02J 3/386; H02J 7/0068; H02J 7/35;
(Continued)

(56) References Cited

U.S. PATENT DOCUMENTS 3,419,779 A * 12/1968 Zehner ...................... H02J 7/35
320/163
8,461,807 B2 * 6/2013 Senriuchi .............. H02J 7/0031
320/134

(Continued)

FOREIGN PATENT DOCUMENTS

EP 2393153 12/2011
EP 2451042 5/2012

(Continued)

OTHER PUBLICATIONS

Japanese Office Action (with English translation) dated Oct. 11, 2016 in corresponding Japanese application No. 2013-272777 (7 pages).

(Continued)

*Primary Examiner* — Daniel J Cavallari
*Assistant Examiner* — Brian K Baxter
(74) *Attorney, Agent, or Firm* — K&L Gates LLP

(57) ABSTRACT

A power supply control device includes a control unit, and a power path that is connected to a primary external power system. If a connection state between the primary external power system and the power path is in a disconnected state, the control unit is configured to control power output of at least one power conditioner of at least one corresponding
(Continued)

secondary external power generation unit, based on (a) an amount of power consumption of a specific load connected to the power supply control device through the power path, and (b) a power generation output of the secondary external power generation unit.

18 Claims, 9 Drawing Sheets

(51) Int. Cl.
    *H02J 7/35*      (2006.01)
    *H02J 3/14*      (2006.01)
    *H02J 3/32*      (2006.01)
    *H02J 7/00*      (2006.01)
    *H02J 9/06*      (2006.01)
    *H02M 3/04*      (2006.01)
    *H02M 7/68*      (2006.01)

(52) U.S. Cl.
    CPC ............. *H02J 7/0068* (2013.01); *H02J 7/35* (2013.01); *H02J 9/00* (2013.01); *H02J 9/061* (2013.01); *H02M 3/04* (2013.01); *H02M 7/68* (2013.01); *Y02B 70/3225* (2013.01); *Y02E 10/56* (2013.01); *Y02E 70/30* (2013.01); *Y04S 20/222* (2013.01)

(58) Field of Classification Search
    CPC .. H02J 9/00; H02J 9/061; H02M 3/04; H02M 7/68; Y02B 70/3225; Y02E 10/563; Y02E 10/566; Y02E 70/30; Y04S 20/222
    USPC .......................................................... 307/52
    See application file for complete search history.

(56) References Cited

U.S. PATENT DOCUMENTS

| | | | | |
|---|---|---|---|---|
| 9,711,967 | B1* | 7/2017 | Czarnecki | H02J 5/00 |
| 2005/0006958 | A1* | 1/2005 | Dubovsky | H02J 3/382 |
| | | | | 307/64 |
| 2007/0063671 | A1* | 3/2007 | Simpson | H02J 7/0013 |
| | | | | 320/116 |
| 2008/0203820 | A1* | 8/2008 | Kramer | H02J 3/38 |
| | | | | 307/64 |
| 2010/0000804 | A1* | 1/2010 | Yeh | B60K 16/00 |
| | | | | 180/2.2 |
| 2010/0174418 | A1* | 7/2010 | Haugh | G06F 1/26 |
| | | | | 700/295 |
| 2011/0273019 | A1* | 11/2011 | de Caires | H02J 7/35 |
| | | | | 307/66 |
| 2012/0299383 | A1* | 11/2012 | Cyuzawa | H02J 3/381 |
| | | | | 307/75 |
| 2012/0306271 | A1* | 12/2012 | Kuriyama | H02J 9/00 |
| | | | | 307/23 |
| 2013/0147274 | A1* | 6/2013 | Ku | H02J 3/383 |
| | | | | 307/31 |
| 2014/0062192 | A1* | 3/2014 | Vichnyakov | H02J 3/385 |
| | | | | 307/26 |
| 2014/0181541 | A1* | 6/2014 | Matsumoto | H02J 7/0031 |
| | | | | 713/300 |
| 2014/0285010 | A1* | 9/2014 | Cameron | H02J 1/14 |
| | | | | 307/29 |
| 2014/0361624 | A1* | 12/2014 | Ault | H02J 9/062 |
| | | | | 307/65 |
| 2015/0028677 | A1* | 1/2015 | Iwasaki | H02J 9/06 |
| | | | | 307/52 |
| 2015/0295413 | A1* | 10/2015 | Dent | H02M 7/53871 |
| | | | | 307/77 |
| 2015/0318700 | A1* | 11/2015 | Inakagata | H02J 3/32 |
| | | | | 307/20 |
| 2016/0016483 | A1* | 1/2016 | Yasunori | B60L 11/14 |
| | | | | 320/162 |
| 2016/0202682 | A1* | 7/2016 | Matsumoto | G06Q 50/06 |
| | | | | 700/291 |
| 2016/0211670 | A1* | 7/2016 | Nakayama | H02J 3/383 |

FOREIGN PATENT DOCUMENTS

| | | |
|---|---|---|
| EP | 2602903 | 6/2013 |
| JP | 2002-199589 A | 7/2002 |
| JP | 3172855 U | 1/2012 |
| JP | 2013-176282 | 9/2013 |
| JP | 2013183613 | 9/2013 |
| JP | 2013-226027 A | 10/2013 |
| WO | 2013/179357 A1 | 12/2013 |

OTHER PUBLICATIONS

International Search Report issued in PCT/JP2014/006240, dated Mar. 25, 2015 (4 pages).

European Office Action dated Mar. 11, 2019 in corresponding European Application No. 14 830 416.5.

* cited by examiner

[Fig. 1]
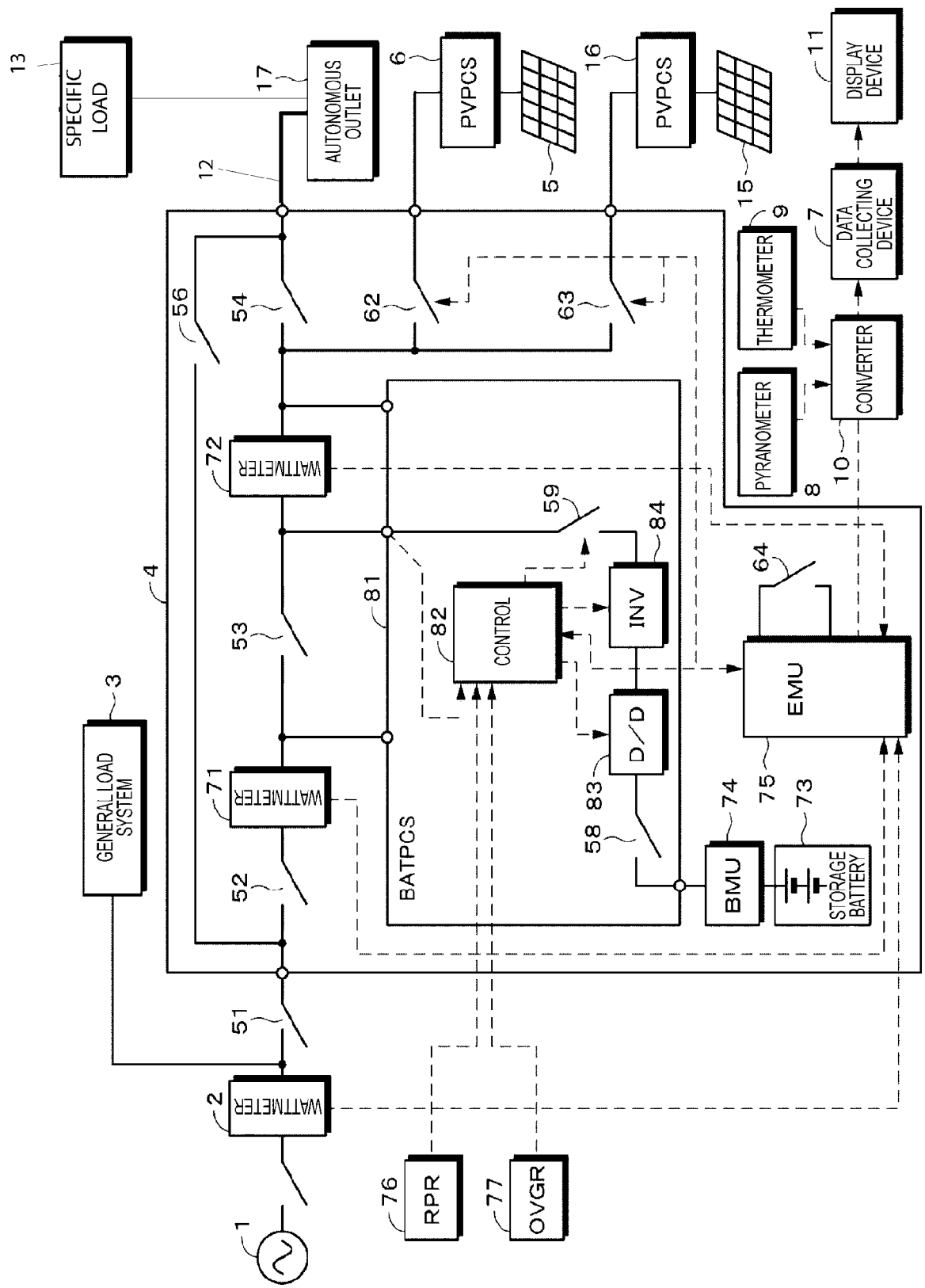

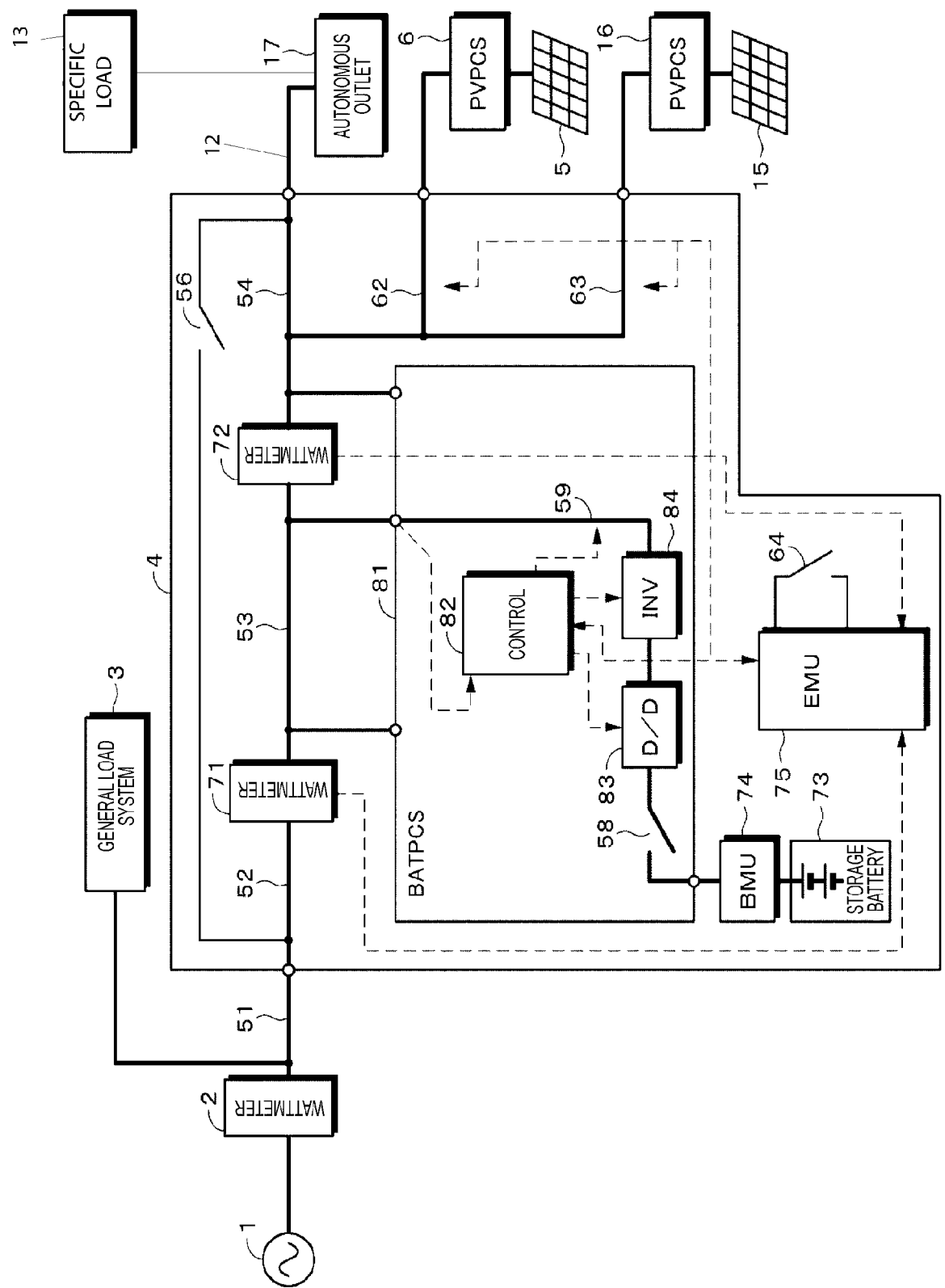
[Fig. 2]

[Fig. 3]
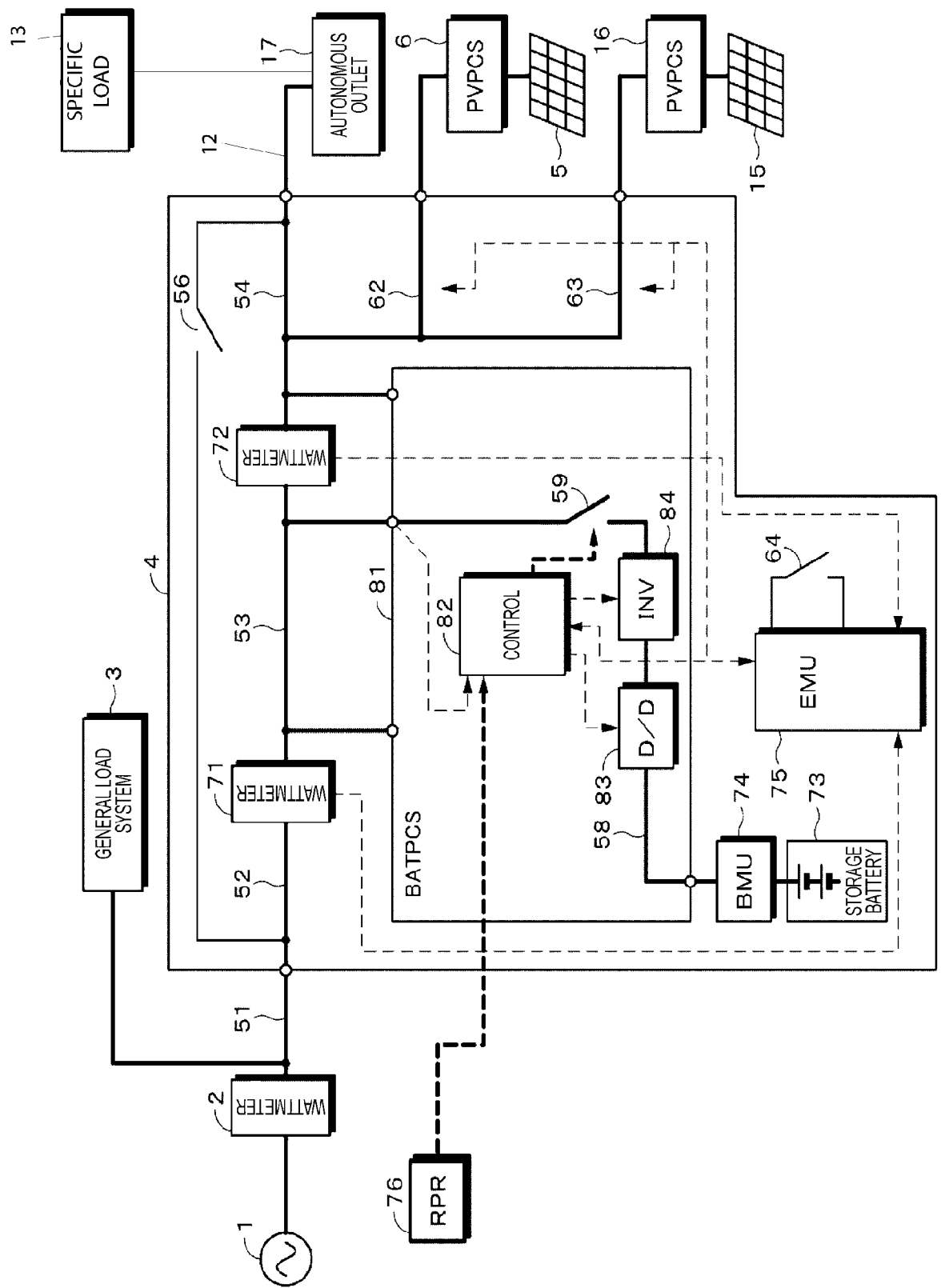

[Fig. 4]
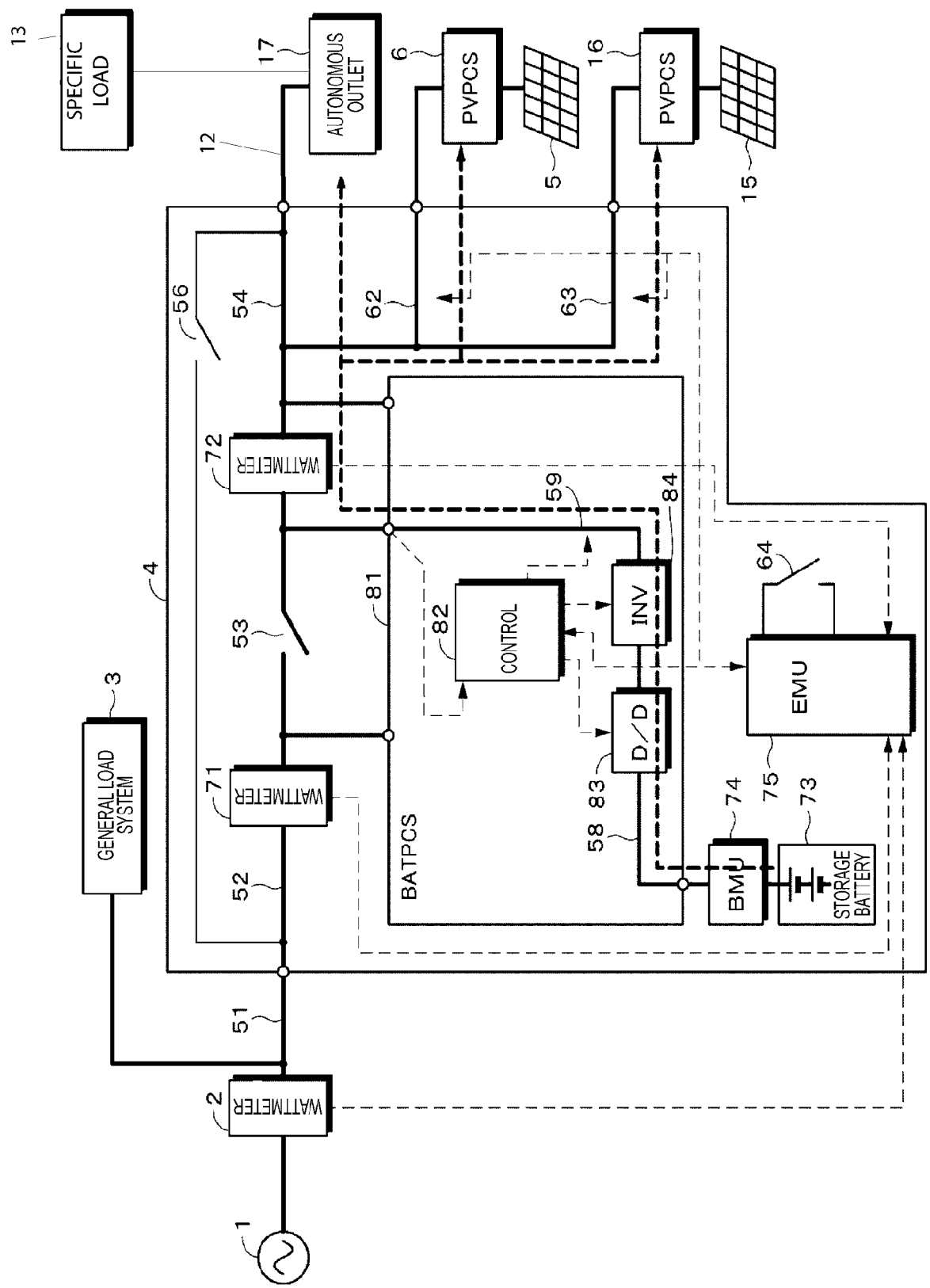

[Fig. 5]
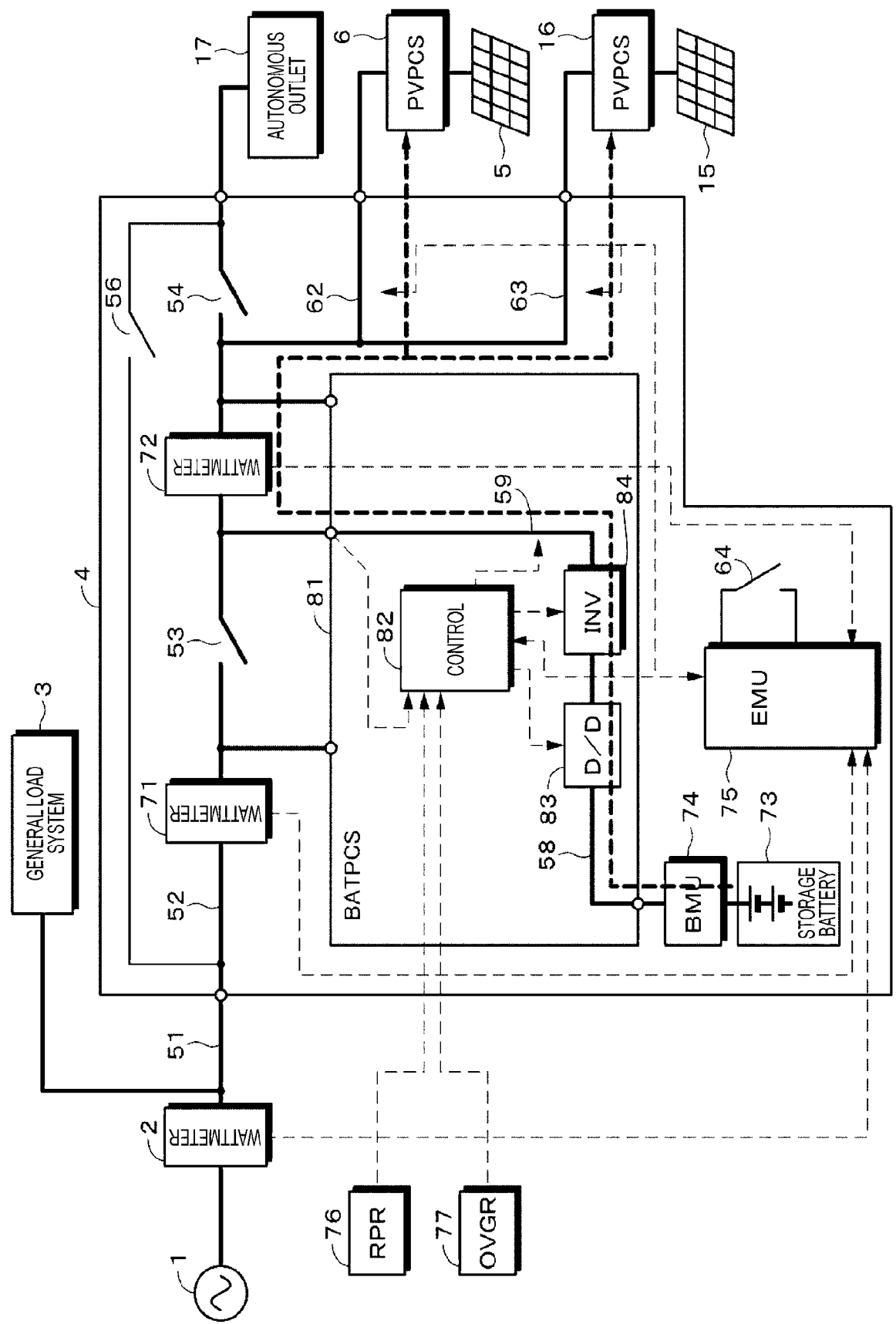

[Fig. 6]
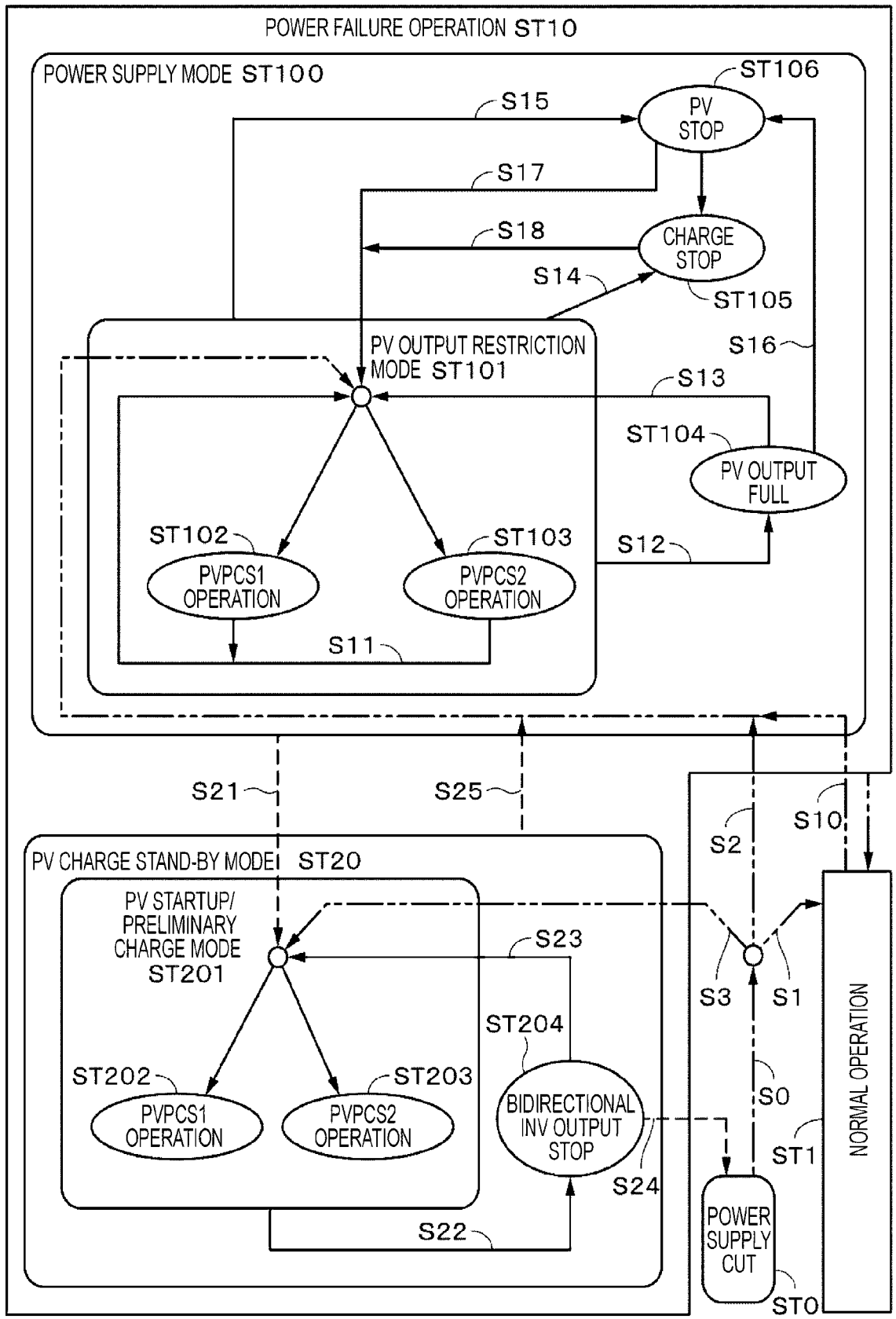

[Fig. 7]
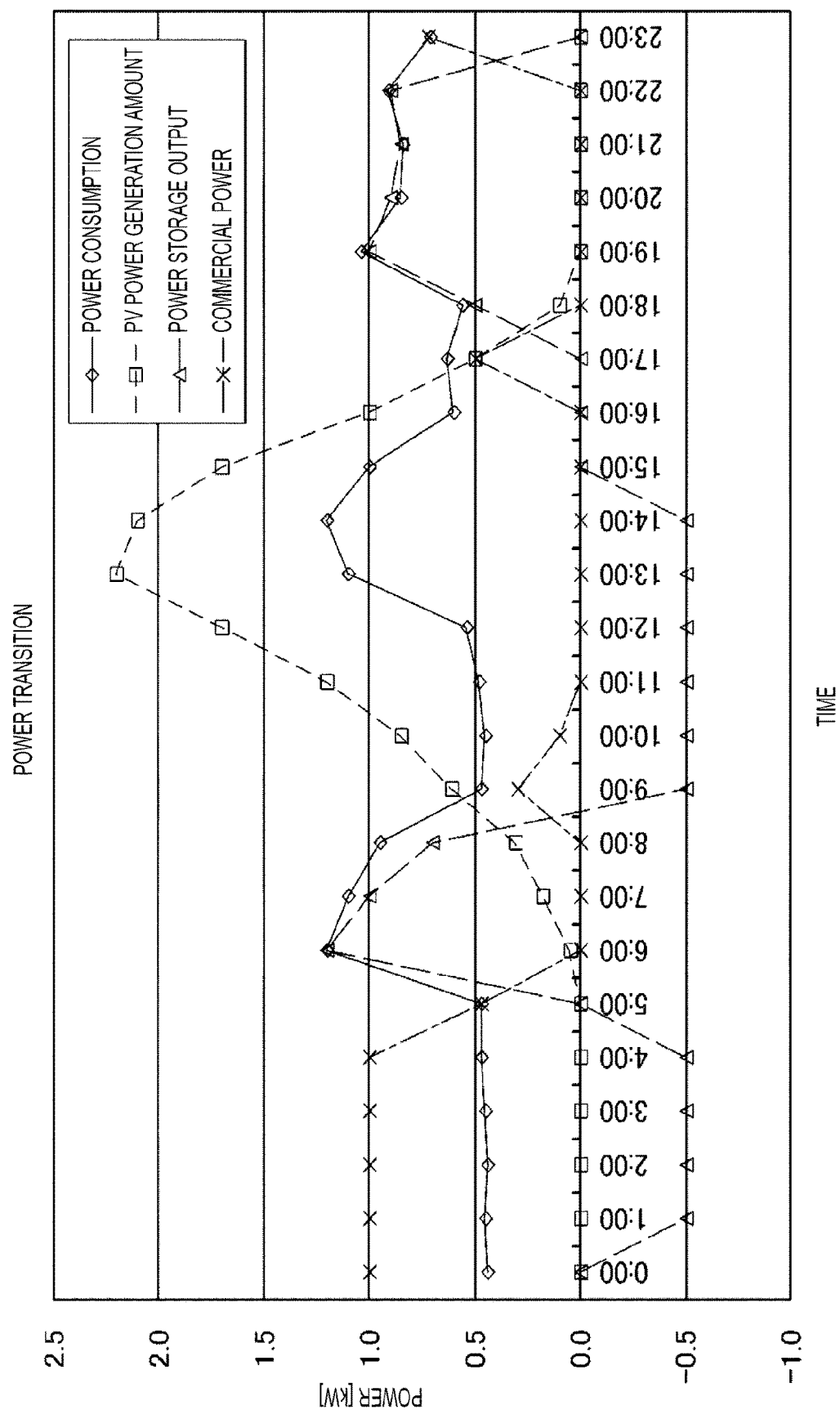

[Fig. 8]
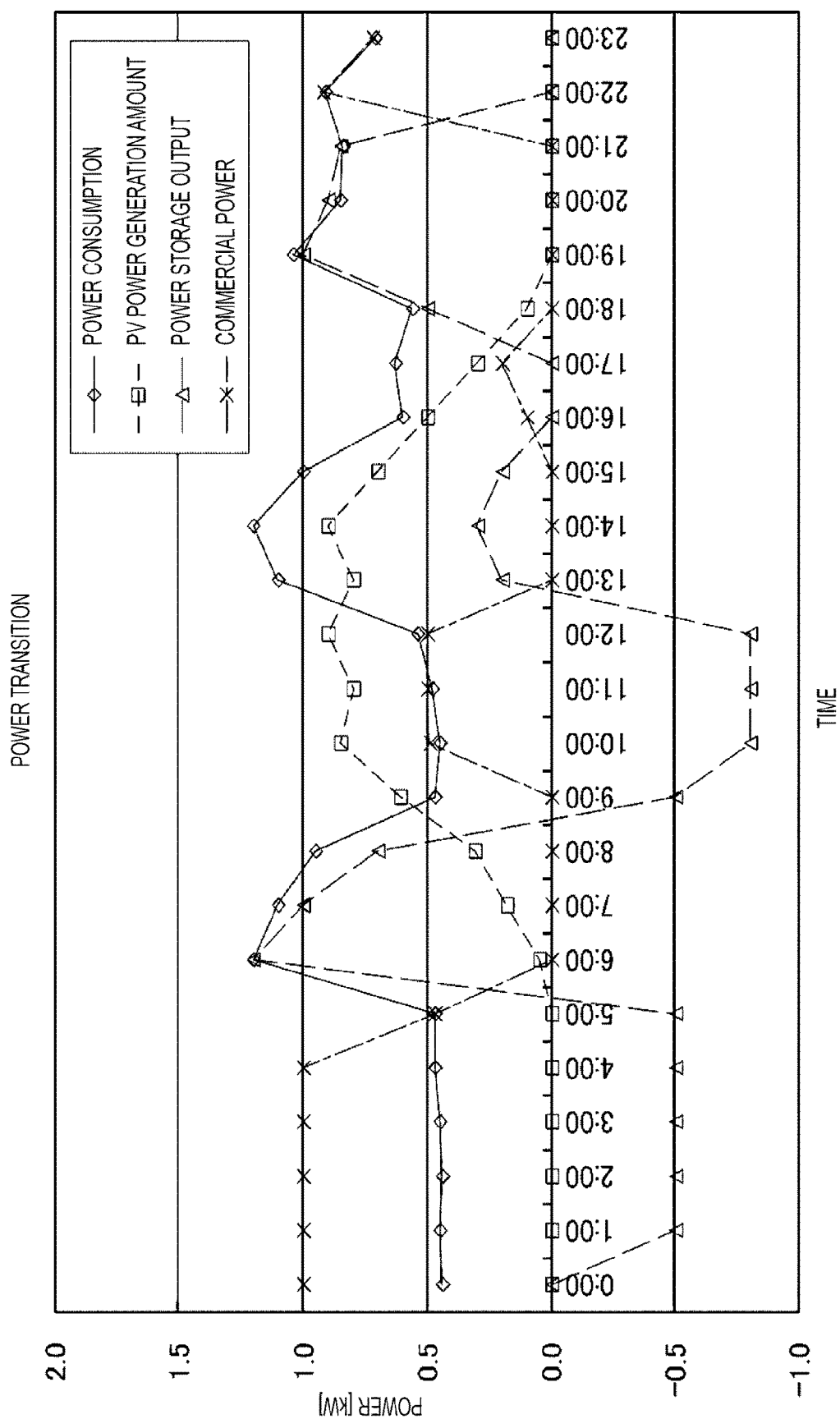

[Fig. 9]
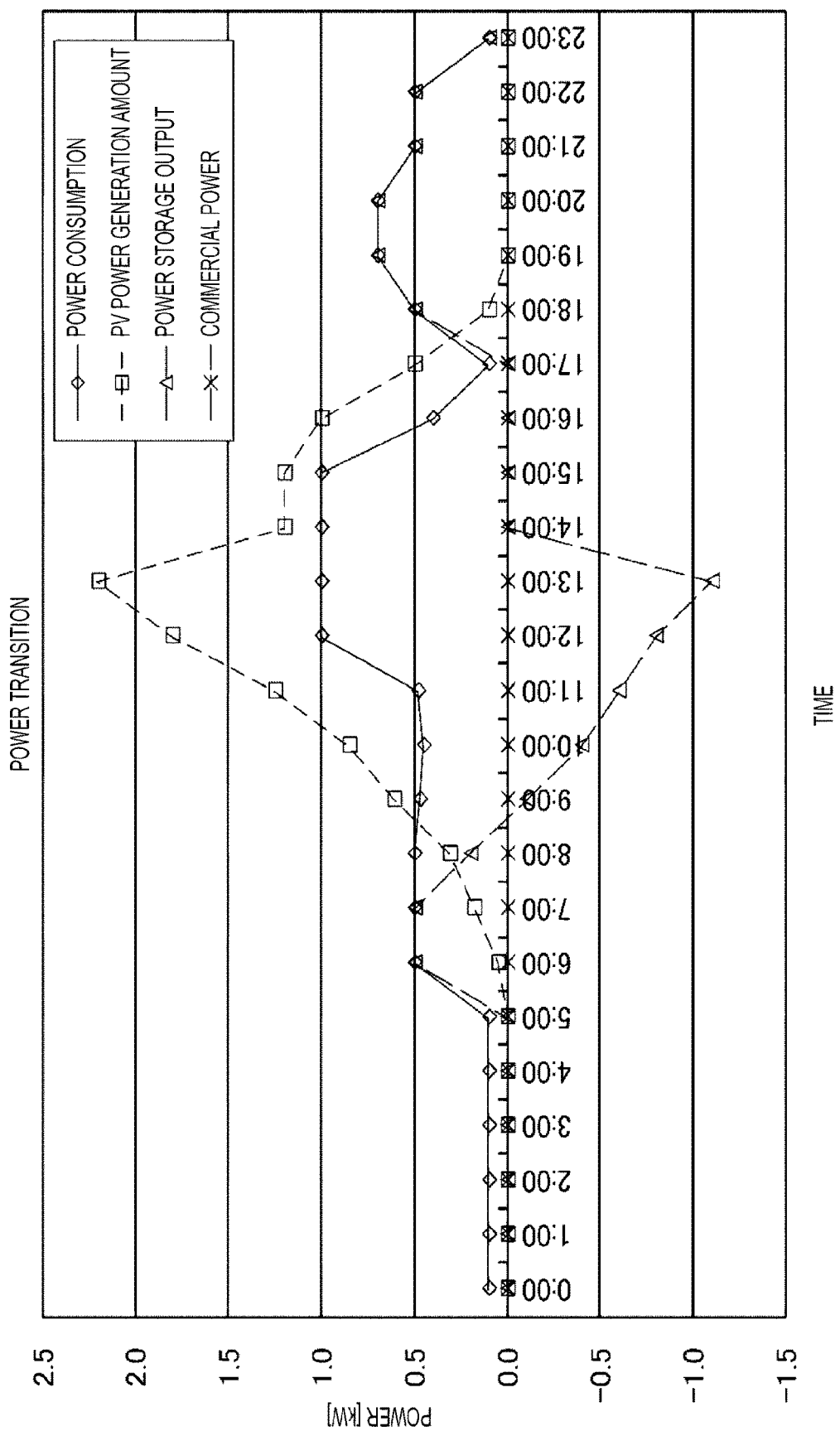

POWER SUPPLY DEVICE, POWER SUPPLY SYSTEM, AND METHOD OF CONTROLLING POWER SUPPLY

CROSS REFERENCE TO RELATED APPLICATIONS

The present application is a national stage of International Application No. PCT/JP2014/006240 filed on Dec. 16, 2014 and claims the benefit of Japanese Priority Patent Application JP 2013-272777 filed on Dec. 27, 2013, the entire contents of which are incorporated herein by reference.

TECHNICAL FIELD

The present disclosure relates to a power supply device, a power supply system, and a method of controlling power supply, including a power generation unit such as solar photovoltaics and a power storage unit such as a battery, in addition to system power.

BACKGROUND ART

In recent years, solar photovoltaic (hereinafter, appropriately abbreviated as PV) systems using solar panels are provided at home, in buildings, and the like. Not only the power generation by sunlight, but also the power generation by wind power, natural energy such as geothermal heat, fuel energy, or microorganisms has been put into practical use.

Usually, power generated by PV is supplied to devices used in a house in a case of a residual power purchase system, and excess power is sold to a power company. However, when power failure is caused due to an earthquake or the like, the mode of the PV is manually changed into an autonomous operation mode. In the autonomous operation mode, the power generated by the PV is supplied to an emergency autonomous outlet only. By switching to the autonomous operation, electronic devices connected to the autonomous outlet can be used even in the power failure state. Types of electronic devices to be used at the time of power failure are set by the user in advance.

Further, the PV cannot generate power during night, and the like, because it generates power by sunlight. To avoid this problem, a power generation system further including a secondary battery and the like is considered. For example, Patent Literature 1 describes that power in a storage battery is output to a power line, and a power conditioner of a solar photovoltaic system is started based on the power at the time of power failure. Further, Patent Literature 1 describes that, when the storage battery is nearly fully charged, a power generation device is stopped in order to avoid excessive charging.

CITATION LIST

Patent Literature

PTL 1: JP 2013-176282A

SUMMARY

Technical Problem

To decrease cost of the power generation system, it is desirable to use a commercially available power conditioner system (hereinafter, appropriately, abbreviated as PCS). Currently commercially available PCSs cannot control power according to a load in a system interconnection state, and is operated to output generated power at a maximum. Therefore, when the power generation system as described in Patent Literature 1 is configured from a commercially available PCS, there is a problem of an increase in a voltage of a load line due to excessive power supply from a power generation unit. To avoid the problem, it is necessary to use a specially-designed PCS having a power control function, and thus there is a problem of an increase in the cost.

Therefore, it is desirable to provide a power supply device, a power supply system, and a method of controlling power supply capable of suppressing abnormal voltage variation of a load line while using an existing PCS.

Solution to Problem

In an embodiment, a power supply control device includes a control unit, and a power path that is connected to a primary external power system. If a connection state between the primary external power system and the power path is in a disconnected state, the control unit is configured to control power output of at least one power conditioner of at least one corresponding secondary external power generation unit, based on (a) an amount of power consumption of a specific load connected to the power supply control device through the power path, and (b) a power generation output of the secondary external power generation unit.

In another embodiment, a power supply control system includes a power supply control device that includes a control unit, and a power path that is connected to a primary external power system, and a secondary external power generation system that is separate from the primary external power system and that is connected to the power supply control device. The secondary external power generation system includes at least one photovoltaic cell and a corresponding photovoltaic power conditioner connected to the photovoltaic cell. If the connection state information indicates that the primary external power system and the power path are in a disconnected state, said control unit is configured to control the power output of the photovoltaic power conditioner based on (a) an amount of power consumption of a specific load connected to the power supply control device through the power path, and (b) a power generation output of the secondary external power generation system.

In another embodiment, a method of controlling a power supply of a power supply device includes controlling, if a connection state between a primary external power system and a power path is in a disconnected state, power output of at least one power conditioner of at least one corresponding secondary external power generation unit based on (a) an amount of power consumption of a specific load connected to the power supply control device through the power path, and (b) a power generation output of the secondary external power generation unit.

According to another embodiment of the present disclosure, there is provided a power supply device including:

an AC power path to which system power is input, and configured to supply power to a specific load;

a power storage unit;

a first path including a first power conditioner arranged between the power storage unit and the AC power path;

one or a plurality of power generation units;

one or a plurality of second power conditioners capable of being operated by the power storage unit;

a second path including the second power conditioner arranged between the power generation unit and the AC power path; and a control unit configured to control connection between the second path and the AC power path, wherein the control unit controls ON/OFF of the second power conditioner according to a power generation output of the power generation unit and power consumption of the specific load when connection between the system power and the AC power path becomes disconnected.

Advantageous Effects of Invention

According to at least one embodiment, the present disclosure uses a commercially available PCS. Therefore, the present disclosure can build a power storage system in the form of extension with any already-installed solar photovoltaic system having any characteristics (photovoltaic panel+PCS). Therefore, currently holding assets can be used as they are, and the system can be realized at low cost. Note that the effects described here is not necessarily limited, and any effect described in the present disclosure may be exerted.

BRIEF DESCRIPTION OF DRAWINGS

FIG. 1 is a block diagram illustrating a system configuration of an embodiment of the present disclosure.

FIG. 2 is a block diagram used for description of a power storage unit power conditioner and a PV power conditioner in an embodiment of the present disclosure.

FIG. 3 is a block diagram used for description of selling of residual power in an embodiment of the present disclosure.

FIG. 4 is a block diagram used for description of at the time of power failure in an embodiment of the present disclosure.

FIG. 5 is a block diagram used for description of a system at the time of return in an embodiment of the present disclosure.

FIG. 6 is a state transition diagram used for description of an operation in an embodiment of the present disclosure.

FIG. 7 is a graph illustrating an example of power transition in an embodiment of the present disclosure.

FIG. 8 is a graph illustrating another example of power transition in an embodiment of the present disclosure.

FIG. 9 is a graph illustrating still another example of power transition in an embodiment of the present disclosure.

DESCRIPTION OF EMBODIMENTS

Embodiments described below are favorable specific examples of the present disclosure, and technically favorable various limitations are added thereto. However, the scope of the present disclosure is not limited to these embodiments unless otherwise specifically stated to limit the present disclosure in the following description. Note that description below will be given in the following order.
<1. One Embodiment>
<2. Modification>

1. One Embodiment

System Configuration
FIG. 1 illustrates a system configuration of a power generation device according to an embodiment of the present disclosure. In one embodiment of the present disclosure, a parallel-off switch 52 is connected to an input side of system power, and a power storage device 4 including a power storage device power conditioner 81 and a storage battery 73, and a PV power generation system including solar power conditioners 6 and 16 and solar panels 5 and 15 are connected between a main AC power path and a specific load connected to an autonomous outlet 17. The solar power conditioners 6 and 16 include a power conversion unit made of a DC-DC converter unit and a DC-AC inverter unit. The DC-DC converter unit raises an input DC voltage, and the DC-AC inverter unit converts a DC voltage from the DC-DC converter unit into AC power. Further, the solar power conditioners 6 and 16 performs maximum power point tracking (MPPT). The solar power conditioners 6 and 16 are operated using an output of the power storage device power conditioner 81 as power supply.

In this configuration, when power failure is caused, the parallel-off switch 53 is turned OFF and the power storage device power conditioner 81 is started, and power supply is performed to an AC power supply path. Further, the PV power generation system detects that there is power in the AC power supply path, starts the PCS of the PV power generation system, and starts an output.

The PV power generation system is configured from two sets of the solar panels 5 and 15 as power generation units and the solar power conditioners 6 and 16, which are arranged in parallel. The PV power generation system controls ON/OFF of outputs of the solar power conditioners 6 and 16 according to a remaining capacity of the storage battery 73 and the specific load. With the control, a risk of an increase in a voltage in the AC power supply path due to an excessive output of the PV power generation system is avoided, and the system can be safely and efficiently used.

Further, when there is no generated power and storage power is also reduced at the time of power failure, the power storage device 4 is stopped in a state where stored power necessary for restart of the solar power conditioners 6 and 16 is left. When the generated power is returned, the fact that the generated power is returned is notified to the power storage device 4 side through a communication line. The power storage device 4 that has received the notification starts the solar power conditioners 6 and 16 using the power remained in the storage battery 73, and outputs power supply to the AC power supply path. Therefore, the system can be automatically returned without human work.

The system configuration will be further described with reference to FIG. 1. A general load 3 is connected to a power system 1 through a wattmeter 2. A wattmeter 71 is connected from the wattmeter 2 through switches 51 and 52. The switches 51, 52, and 56 are configured from manual switches. Switches 53 and 54 are configured from contacts of relay, for example, contacts of electromagnetic relay. Switches 58, 59, 62, and 63 are also configured from contacts of relay.

A wattmeter 72 is connected to the wattmeter 71 through the switch 53. Further, the autonomous outlet 17 is connected to the wattmeter 72 through switches 54 and 55. The autonomous outlet 17 is an emergency outlet that can take out power at the time of power failure. A plurality of autonomous outlets 17 may be provided as needed.

The wattmeter 2, and the wattmeters 71, and 72 are inserted into an AC power path, and can measure an input of power from the power system 1, and an output (reverse power flow) of power to the power system 1, respectively. The wattmeters 71 and 72 are provided in the power storage device 4. A path including the switch 56 that bypasses the wattmeters 71 and 72 is provided.

AC power at an output side of the wattmeter 71 is supplied to the power storage device power conditioner (hereinafter, appropriately abbreviated as BATPCS) 81. Further, AC power at an output side of the wattmeter 72 is supplied to BATPCS 81.

For example, the storage battery 73 configured from a battery pack including a large number of lithium ion secondary batteries is provided. A battery management unit (BMU) 74 for controlling charging/discharging is connected to the storage battery 73. The BMU 74 is connected to a DC-DC converter 83 in the BATPCS 81 through the switch 58.

The DC-DC converter 83 in the BATPCS 81 is connected to a bidirectional inverter 84. The bidirectional inverter 84 is a bidirectional inverter having a function to convert a direct current into an alternating current and a function to convert an alternating current into a direct current. That is, the DC-DC converter 83 and the bidirectional inverter 84 configure a bidirectional power conditioner. The bidirectional inverter 84 is connected to the wattmeter 72 through the switch 59.

A control unit 82 for controlling internal circuits and switches is provided in the BATPCS 81. An output of a counter electromotive force relay (RPR) 76 and an output of a ground fault overvoltage relay (OVGR) 77 are supplied to the control unit 82.

The control unit 82 is connected to an energy management unit (EMU) 75 that is a higher controller. The EMU 75 controls the entire operation (mode switching) of the power storage device 4. A start/return switch 64 is provided in connection with the EMU 75. By manually pressing of the start/start/return switch 64, the system can be returned from a system stop state to a system operating state. The BMU 74, the control unit 82, and the EMU 75 are configured from a microcomputer.

An output of the wattmeter 72 is connected to the power storage device 4. When a current flows in the BATPCS 81, the switch 54 is turned ON.

A plurality of power generation units, for example, sets of the solar panels 5 and 15 and the solar power conditioners 6 and 16 are provided in parallel, separately from the power storage device 4. The solar panels 5 and 15 are installed at positions irradiated with sunlight, and generate power by the sunlight. The generated power is output to each of the solar power conditioners (hereinafter, abbreviated as PVPCS) 6 and 16 through cables or the like. Three or more solar panels and PVPCSs may be provided. The PVPCSs 6 and 16 have a function to output maximum power, similarly to existing power conditioners, and do not have a power control function. Output power of the PVPCS 6 and output power of the PVPCS 16 are connected to between the wattmeter 72 and the switch 54 through the switches 62 and 63, respectively. By control of the switches 62 and 63, outputs of the PVPCSs 6 and 16 can be stopped. Note that the switches 62 and 63 are turned OFF or the outputs of the PVPCSs 6 and 16 are stopped (hereinafter, both are collectively referred to as turning OFF outputs in the PVPCSs). ON/OFF of the outputs of the PVPCSs may be controlled by the switches 62 and 63, and the outputs may be turned OFF by control of the PVPCSs 6 and 16.

Conditions of receiving irradiation of sunlight of the solar panels 5 and 15 may be the same or may be different. To predict power generation states of the solar panels 5 and 15, a pyranometer 8 and a thermometer 9 are provided. Data of the pyranometer 8 and the thermometer 9 is converted into digital data by a converter 10, and is supplied to a data collecting device 7. The collected data is transmitted from the data collecting device 7 to the EMU 75 of the power storage device 4. Further, the collected data may be displayed by a display device 11. Note that a power generation device that uses natural energy such as wind power, or a power generation device that use fuel, other than the PV may be used as the power generation unit.

At the time of a normal operation (at the time of non-power failure)

An outline of an operation of an embodiment of the present disclosure will be described.

(a) Startup of the BATPCS and the PVPCSs (a-1) When the system power is supplied to the power storage device 4, the switch 53 is automatically turned ON, as illustrated in the configuration of FIG. 2. Further, the switch 54 is also automatically turned ON.

(a-2) The wattmeter 71 detects the system power, and transmits information thereof to the EMU 75 at the same time as (a-1). By control of the EMU 75, the control unit 82 of the BATPCS 81 is turned ON. By the control unit 82, the BATPCS 81 and the PVPCSs 6 and 16 detect system connection, and the system operation becomes in a stand-by state.

(a-3) Following that, the BATPCS 81 and the PVPCSs 6 and 16 are started from the stand-by state within 300 seconds, for example (transferred to an operating state). The control unit 82 turns the switch 59 ON, so that an output of the storage battery 73 becomes available.

(b) Outputs from the PVPCSs 6 and 16 and the BATPCS 81

(b-1) When power generation has been performed in the solar panels 5 and 15, the PVPCSs 6 and 16 start outputs, and supply power to the entire general load 3.

When the general load 3 is smaller than a solar photovoltaic amount, the storage battery 73 is charged by residual power of the solar photovoltaics.

When the solar photovoltaic amount is small, the power is supplied from the storage battery 73, and when the power is still insufficient, the power is supplied from the system.

The EMU 75 collects information of the wattmeters 2, 71, and 72, calculates an operation state of the entire power supply system, demand information, a power generation state, and the like based on the collected information, and automatically controls the power supply system to suppress power purchase from the system to the minimum.

(c) Selling of residual power (c-1) The residual power of the solar photovoltaics is sold. Control of the power storage device 4 at that time is performed as follows. FIG. 3 is a connection configuration illustrating an operation of the control. When a reverse power flow is caused, the counter electromotive force relay 76 detects the reverse power flow and transmits a stop signal to the control unit 82 of the BATPCS 81 so that discharge power from the power storage device 4 do not reversely flow.

(c-2) The control unit 82 of the BATPCS 81 transmits a control signal, opens the switch 59, and stops the output of the BATPCS 81.

An operation at the time of power failure (d) A flow of a current at the time of system power failure (daytime)

At the time of system power failure, connection is as illustrated in FIG. 4.

(d-1) At the time of system power failure, the switch 53 is opened, and parallel-off is performed.

(d-2) The BATPCS 81 performs an autonomous operation, and the PVPCSs 6 and 16 that has received an output thereof perform a system operation. A system operation output in synchronization with the output of the BATPCS 81 becomes available instead of an autonomous output, in which the output is restricted. Therefore, in the present embodiment, a total of 20 kw can be output where a maximum output of one PVPCS is 10 kw.

(d-3) A load of the autonomous outlet 17 is small due to full charge, the switch 62 or 63 is turned OFF, and excessive power supply to charge lines of the autonomous outlet 17 and the storage battery 73 is stopped. As described above, ON/OFF of the PVPCSs 6 and 16 (ON/OFF of the switches 62 and 63) is controlled according to the load of the autonomous outlet 17 due to full charge and the power generation amounts of the PVs.

(e) A flow at the time of system power failure (nighttime)

In the nighttime, the PVPCSs 6 and 16 are stopped, and only the power supply from the BATPCS 81 by the autonomous output is available.

(e-1) When the power failure is lengthened and the remaining capacity of the storage battery 73 is decreased to necessary power for restarting the PVPCSs 6 and 16 (e.g., 10% or less of the remaining capacity), the EMU 75 stops discharging from the storage battery 73 because the EMU 75 monitors the remaining capacity of the storage battery 73, and causes the mode to be a stand-by operation mode. In the stand-by operation, the BATPCS 81 automatically stops the discharging, transferred to the stand-by operation, and maintains a state in which the PVPCSs 6 and 16 can be restarted.

(e-2) When solar radiation is confirmed with the pyranometer 8 or a PV panel voltage, or the time to expect the solar radiation comes according to a clock built in the EMU 75, the BATPCS 81 resumes the power supply, and restarts the PVPCSs 6 and 16. Determination may be made by a combination of the both conditions. For example, when the PV panel voltage is a voltage equal to or more than a voltage that can start the PVPCSs 6 and 16 in (8 o'clock to 19 o'clock), the BATPCS 81 restarts the PVPCSs 6 and 16. Therefore, charging of the storage battery 73 is started. When the remaining capacity of the storage battery 73 is recovered to about 20%, for example, the power supply to the load is resumed by a flow of normal power at the time of power failure, through the autonomous outlet 17. At the same time, the storage battery 73 is charged with the residual power.

(f) Restoration of the system by sunlight from a control power supply loss state of the storage battery 73

When the remaining capacity of the storage battery 73 is decreased to a threshold of system stop, the switch 59 is opened and the power supply to the load is stopped, and the system is transferred to system stop.

When system returning is performed from the system stop state

Control of when system returning performed is illustrated in FIG. 5.

(f-1) After it is confirmed that there is solar radiation and the solar photovoltaics is available, the start/return switch 64 is turned ON, so that the BATPCS 81 is started. An output is generated from the BATPCS 81.

(f-2) The PVPCSs 6 and 16 are started, and starts a system operation. The storage battery 73 is charged by the solar photovoltaic power, and when the storage battery 73 is charged to a set threshold (about 15%), the switch 54 is turned ON, and power supply is resumed from the BATPCS 81 and the PVPCSs 6 and 16 to the load connected to the autonomous outlet 17, and the system is transferred to a normal operation.

(g) An operation of when the power of the system is recovered (g-1) The EMU 75 detects the power recovery according to the information from the wattmeter 71.

(g-2) The BATPCS 81 is transferred from the autonomous output to a stop state.

(g-3) The PVPCSs 6 and 16 are stopped using communication from the EMU 75.

(g-4) After a fixed period elapses, the BATPCS 81 turns the switch 53 ON. Therefore, the power supply is resumed from the power system 1 to the power storage device 4, and the BATPCS 81 and the PVPCSs 6 and 16 resume the system operation. In this way, the normal operation mode is started.

State Transition

The above-described control of an embodiment of the present disclosure will be further described with reference to the state transition diagram of FIG. 6. The states are roughly classified into a power supply interruption state ST0, a normal operation state ST1, and a power failure operation state ST10. Further, the power failure operation state ST10 includes a power supply mode ST100, a PV output restriction mode ST101, and a PV charge stand-by mode ST20.

In the power supply interruption state ST0, in step S0, when the start/return switch 64 is turned ON, the state is transferred into any of the normal operation state ST1, the power failure operation state ST10, and the PV charge stand-by mode ST20. In step S1, when it is determined that there is system power, the processing is moved onto the normal operation state ST1. In step S2, when it is detected that there is no system power (power failure), the processing is moved onto the power failure operation state ST10. In step S3, when the power failure is detected, and it is determined that the remaining capacity of the battery is less than a stand-by condition, the processing is moved onto the PV charge stand-by mode ST20.

Power Failure Operation Mode

In the normal operation state ST1, when the power failure is detected (step S10), the state is transferred to the PV output restriction mode ST101 of the power supply mode ST100. The PV output restriction mode ST101 is a mode to selectively operate one of the two PVs. That is, one of the PVPCSs connected to the solar panels, which is more likely to be able to secure larger generated power, is selectively operated (a PVPCS1 operation mode ST102 or a PVPCS2 operation mode ST103). The PVPCS 6 in FIG. 1 is called PVPCS1 in FIG. 6, and the PVPCS 16 is called PVPCS2. When it is determined that the power amount is smaller than a specified value in the PVPCS1 operation mode ST102 or in the PVPCS2 operation mode ST103, the processing is returned to the selection operation of the PVPCSs (step S11).

When determination of step S12 is established in the PV output restriction mode ST101 (the PVPCS1 operation mode ST102 or the PVPCS2 operation mode ST103), the mode is moved onto a PV output full mode ST104 that makes a PV output full. The PV output full mode is a mode to turn all of the PVPCSs (the PVPCS1 and the PVPCS2) ON. Step S12 is a case in which it can be expected that the power does not exceed inputtable power of the bidirectional inverter 84 even if all of the PVPCSs are operated because the generated power of the PVs becomes small or due to an increase in load power.

When determination of step S13 is established in the PV output full mode ST104, the processing is returned to the PV output restriction mode ST101. Step S13 is a case in which it can be expected that the power exceeds the inputtable power of the bidirectional inverter 84 when power conditioners of all of the PVPCSs are operated because the power generation amounts of the PVs is increased or the load power is decreased. The prediction in step S12 or S13 is performed by comparison of each of current power generation amounts of the PVs, the load power, and the inputtable power of the bidirectional inverter 84.

When determination of step S14 is established in the PV output restriction mode ST101, the processing is transferred to a charge stop mode ST105. In the charge stop mode ST105, all of the PCSs are turned OFF. In step S14, it is determined that it can be expected that the power exceeds the inputtable power of the bidirectional inverter 84 of the BATPCS 81 even if the operation is performed by one PVPCS, due to an increase in the power generation amount of the PV or a decrease in the load power.

When determination of step S15 is established in the PV output restriction mode ST101, the processing is moved onto a PV stop mode ST106. In the PV stop mode ST106, all of the PVPCSs 6 and 16 are turned OFF. In step S15, it is determined that a maximum cell voltage in the storage battery 73 has reached a charge stop voltage. Note that, when it is determined that the maximum cell voltage has reached the charge stop voltage in the PV output full mode ST104 (step S16), the processing is also moved onto the PV stop mode ST106.

When it is determined that a state in which the maximum cell voltage is less than a full charge determination voltage has been continued for a predetermined time, for example, for one minute, in step S17 in the PV stop mode ST106, the processing is moved onto the PV output restriction mode ST101. When it is determined that the state in which the maximum cell voltage is less than a recharge determination voltage has been continued for ten minutes in step S18 in the charge stop mode ST105, the processing is moved onto the PV output restriction mode ST101.

PV Charge Stand-By Mode

When it is determined that the battery remaining capacity is less than the stand-by condition (e.g., 10% of the remaining capacity) in step S21 in the power failure operation mode ST10, the processing is transferred to a PV startup/preliminary charge mode ST201 in the PV charge stand-by mode ST20. In the PV charge stand-by mode ST20, the switch 54 is turned OFF, and the power supply to the autonomous outlet 17 is stopped. This is because consumption of the battery power for startup of the PVPCS due to a load is prevented.

In the PV startup/preliminary charge mode ST201 is a mode to selectively operate one of the two PVs. That is, one of the PVPCS1 and the PVPCS2 connected to the solar panels, which is more likely to be able to secure larger generated power, is selectively operates (a PVPCS1 operation mode ST202 or a PVPCS2 operation mode ST203). In the PVPCS1 operation mode ST202, the PVPCS1 is turned ON, and the bidirectional inverter 84 performs an autonomous operation.

When determination of step S22 is established in the PV startup/preliminary charge mode ST201 (the PVPCS1 operation mode ST202 or the PVPCS2 operation mode ST203), the processing is transferred to a bidirectional inverter (INV) output stop mode ST204. The bidirectional inverter (INV) output stop mode 204 is a mode in which the bidirectional inverter is stopped, and the PVPCS are turned OFF. In step S22, it is determined that the generated power is smaller than a specified value.

In the bidirectional inverter (INV) output stop mode 204, in step S23, processing of confirming power generation states of the PVPCS1 and the PVPCS2 in every predetermined time (e.g., in every ten minutes) in a time period of daytime (e.g., 8 o'clock to 19 o'clock).

When it is determined that a minimum cell voltage of the storage battery 73 is a discharge stop voltage (e.g., 3.0 V) or less, or the power of the storage battery 73 runs out, in step S24 in the bidirectional inverter (INV) output stop mode ST204, the state becomes the power supply interruption state ST0. When it is determined that the battery remaining capacity is the stand-by condition+10% (e.g., 20% of the remaining capacity) or more in step S25 in the PV startup/preliminary charge mode ST201, the processing is moved onto the PV output restriction mode ST101 of the power supply mode ST100.

Specific Examples of Power Transition

According to the control of the embodiment of the present disclosure, power transition (time course of one day) as illustrated in FIGS. 7 to 9 is caused. FIG. 7 is an example of the power transition in a fine day, FIG. 8 is an example of the power transition in a cloudy weather, and FIG. 9 is an example of the power transition of when power failure occurs in a fine day. Note that a minimum value of the power generation amount is 0. The negative side of the power indicates a charged state of the power storage device. The PV power generation amount has a peak at 12 o'clock to 13 o'clock. Little power generation amount is caused in the nighttime. The power consumption has peaks in the morning, afternoon, and evening to night, respectively.

The power is changed as follows in the fine day illustrated in FIG. 7.

Nighttime: The system power is used. The power storage device is charged.

Early morning: Mainly the output of the power storage device is used, and partially, the system power is used.

Morning: Mainly, the PV power is used, and partially, the system power is used. The PV power reversely flows to the system.

Daytime: The PV power is used. The power storage device is charged by the PV power.

Daytime to evening: The system power is used. Partially, the PV power is used.

Nighttime: The output of the power storage device is used. Then, the system power is used.

The power is changed as follows in the cloudy weather illustrated in FIG. 8.

Nighttime: The system power is used. The power storage device is charged.

Early morning: Mainly, the output of the power storage device is used, and partially, the system power is used.

Morning: Mainly the PV power is used, and partially, the system power is used. The PV power reversely flows to the system.

Daytime: The PV power is used. Partially, the system power is used. The power storage device is charged.

Daytime to evening: The system power is used. Partially, the PV power is used.

Nighttime: The output of the power storage device is used. Then, the system power is used.

The power is changed as follows at the time of power failure illustrated in FIG. 9.

Nighttime: All-night lights are supplied power by the residual power of the power storage device.

Early morning: The residual power of the power storage device is used.

Daytime: The PV power is used. In a rainy weather, the residual power of the power storage device is used. When the remaining capacity is decreased, the output of the power storage device is paused.

Nighttime: The output of the power storage device is used. Standing power is left.

The above-described embodiment of the present disclosure exerts the effects described below.

Since the present disclosure uses a commercially available PCS, the present disclosure can build a power storage system in the form of extension with any already-installed solar photovoltaic system having any characteristics (panel+PCS). Therefore, currently holding assets can be used as they are, and the system can be realized at low cost.

A plurality of solar photovoltaic systems is connected in parallel, and the switches are connected in the lines from the solar photovoltaic systems to the load. Therefore, an increase in the voltage of the AC power system (load line) due to excessive power supply can be prevented.

The total output of the PVPCS panels is the PCS output or more. Therefore, the power generation amount in the morning and in the evening can be made higher, and an operating ratio of one day can be increased. This configuration is installed in a duplex manner, so that the operation of the reverse flow power in the normal power can be stabilized, and the stability of the PV power generation/charge of the storage battery at the time of power failure can be stabilized. Moreover, reduction of unnecessary power can be realized while the PV power generation is linked with the power supply to the load power where the storage battery is nearly fully charged.

Note that the present disclosure may employ the following configurations.

(1) A power supply control device comprising:
a control unit; and
a power path that is connected to a primary external power system, and
if connection state between the primary external power system and the power path is in a disconnected state, the control unit is configured to control power output of at least one power conditioner of at least one corresponding secondary external power generation unit, based on
(a) an amount of power consumption of a specific load connected to the power supply control device through the power path, and
(b) a power generation output of the secondary external power generation unit.

(2) The power supply control device according to Claim (1), wherein at least one power conditioner is configured to be controlled in synchronization with the primary external power system or an output of a power storage unit that is connected to the control unit.

(3) The power supply control device according to (1) or (2), wherein the control unit is configured to control a number of the power conditioners to be turned on.

(4) The power supply control device according to any one of (1) to (3), wherein the control unit is configured to increase the number of the power conditioners to be turned on when it is estimated that inputtable power of a power conditioner connected to the power storage unit will not be exceeded.

(5) The power supply control device according to any one of (1) to (4), wherein the control unit is configured to decrease the number of the power conditioners to be turned on when it is estimated that inputtable power of a power conditioner connected to the power storage unit will be exceeded.

(6) The power supply control device according to any one of (1) to (5), wherein if a remaining capacity of a power storage unit that is connected to the control unit is a predetermined value or less, supply of power to the specific load is stopped, and the power supply control device is transferred to a stand-by mode in which the at least one power conditioner of a corresponding secondary external power generation unit performs an autonomous operation.

(7) The power supply control device according to (6), wherein when in the stand-by mode, the power conditioner of the secondary external power generation unit and a power conditioner connected to the power storage unit are turned off when generated power of the power conditioner of the secondary external power generation unit is less than a predetermined value, and
wherein the power storage unit is charged when the generated power of the power conditioner of the secondary external power generation unit is larger than the predetermined value.

(8) The power supply control device according to any one of (1) to (7), wherein when a remaining capacity of the power storage unit is larger than a predetermined value, a supply of power to the specific load is resumed.

(9) The power supply control device according to any one of (1) to (8), wherein a power conditioner connected to the power storage unit is a bidirectional power conditioner including a DC-DC converter and a bidirectional inverter.

(10) The power supply control device according to any one of (1) to (9), wherein at least one secondary external power generation unit is a power generation device using solar energy or wind energy.

(11) The power supply control device according to any one of (1) to (10), wherein the specific load is a load connected to an autonomous outlet.

(12) A power supply control system comprising:
a power supply control device that includes a control unit, and a power path that is connected to a primary external power system; and
a secondary external power generation system that is separate from the primary external power system and that is connected to the power supply control device, the secondary external power generation system including at least one photovoltaic cell and a corresponding photovoltaic power conditioner connected to the photovoltaic cell, wherein if the connection state information indicates that the primary external power system and the power path are in a disconnected state, said control unit is configured to control the power output of the photovoltaic power conditioner based on
(a) an amount of power consumption of a specific load connected to the power supply control device through the power path, and
(b) a power generation output of the secondary external power generation system.

(13) The power supply control system according to (12), wherein at least one power conditioner is controlled in synchronization with the primary external power system or an output of a power storage unit that is connected to the control unit.

(14) The power supply control system according to (12) or (13), wherein the control unit is configured to control a number of the power conditioners to be turned on.

(15) The power supply control system according to any one of (12) to (14), wherein the control unit is configured to increase the number of the power conditioners to be turned on when it is estimated that inputtable power of a power conditioner connected to the power storage unit will not be exceeded.

(16) The power supply control system according to any one of (12) to (14), wherein the control unit is configured to decrease the number of the power conditioners to be turned on when it is estimated that inputtable power of a power conditioner connected to the power storage unit will be exceeded.

(17) The power supply control system according to any one of (12) to (16), wherein if a remaining capacity of a power storage unit that is connected to the control unit is a predetermined value or less, supply of power to the specific load is stopped, and the power supply control device is transferred to a stand-by mode in which the at least one power conditioner of a corresponding secondary external power generation unit performs an autonomous operation.

(18) The power supply control system according to (17), wherein when in the stand-by mode, the power conditioner of the secondary external power generation unit and a power conditioner connected to the power storage unit are turned off when generated power of the power conditioner of the secondary external power generation unit is less than a predetermined value, and wherein the power storage unit is charged when the generated power of the power conditioner of the secondary external power generation unit is larger than the predetermined value.

(19) The power supply control system according to any one of (12) to (18), wherein when a remaining capacity of the power storage unit is larger than a predetermined value, a supply of power to the specific load is resumed.

(20) The power supply control system according to any one of (12) to (19), wherein a power conditioner connected to the power storage unit is a bidirectional power conditioner including a DC-DC converter and a bidirectional inverter.

(21) The power supply control system according to any one of (12) to (20), wherein at least one secondary external power generation unit is a power generation device using solar energy or wind energy.

(22) The power supply control system according to any one of (12) to (21), wherein the specific load is a load connected to an autonomous outlet.

(23) A method of controlling a power supply of a power supply device, the method comprising:

controlling, if a connection state between a primary external power system and a power path is in a disconnected state, power output of at least one power conditioner of at least one corresponding secondary external power generation unit based on (a) an amount of power consumption of a specific load connected to the power supply control device through the power path, and (b) a power generation output of the secondary external power generation unit.

(24) The method according to (23), further comprising controlling at least one power conditioner in synchronization with the primary external power system or an output of a power storage unit that is connected to the control unit.

(25) The method according to (23) or (24), further comprising controlling a number of the power conditioners to be turned on.

(26) The method according to any one of (23) to (25), further comprising increasing the number of the power conditioners to be turned on when it is estimated that inputtable power of a power conditioner connected to the power storage unit will not be exceeded.

(27) The method according to any one of (23) to (26), further comprising decreasing the number of the power conditioners to be turned on when it is estimated that inputtable power of a power conditioner connected to the power storage unit will be exceeded.

(28) The method according to any one of (23) to (27), wherein if a remaining capacity of a power storage unit that is connected to a control unit is a predetermined value or less, supply of power to the specific load is stopped, and the power supply control device is transferred to a stand-by mode in which the at least one power conditioner of a corresponding secondary external power generation unit performs an autonomous operation.

(29) The method according to (28), wherein when in the stand-by mode, the power conditioner of the secondary external power generation unit and a power conditioner connected to the power storage unit are turned off when generated power of the power conditioner of the secondary external power generation unit is less than a predetermined value, and wherein the power storage unit is charged when the generated power of the power conditioner of the secondary external power generation unit is larger than the predetermined value.

(30) The method according to any one of (23) to (29), further comprising resuming a supply of power to the specific load when a remaining capacity of the power storage unit is determined to be larger than a predetermined value.

(31) The method according to any one of (23) to (30), wherein the power conditioner connected to the power storage unit is a bidirectional power conditioner including a DC-DC converter and a bidirectional inverter.

(32) The method according to any one of (23) to (31), wherein at least one secondary external power generation unit is a power generation device using solar energy or wind energy.

(33) The method according to any one of (23) to (32), wherein the specific load is a load connected to an autonomous outlet.

Furthermore, note that the present disclosure may employ the following configurations.

(1')

A power supply device including:

an AC power path to which system power is input, and configured to supply power to a specific load;

a power storage unit;

a first path including a first power conditioner arranged between the power storage unit and the AC power path;

one or a plurality of power generation units;

one or a plurality of second power conditioners capable of being operated by the power storage unit;

a second path including the second power conditioner arranged between the power generation unit and the AC power path; and a control unit configured to control connection between the second path and the AC power path, wherein the control unit controls ON/OFF of the second power conditioner according to a power generation output of the power generation unit and power consumption of the specific load when connection between the system power and the AC power path becomes disconnected.

(2')

The power supply device according to (1'), wherein a plurality of sets of the power generation units and the second power conditioners is connected in parallel, and the plurality of second power conditioners is mutually controlled in synchronization with the system power or an output of the power storage unit.

(3')

The power supply device according to (1') or (2'), wherein the control unit controls the number of the second power conditioners to be turned ON, and increases the number of the second power conditioners to be turned ON when inputtable power of the first power conditioner being not exceeded is expectable.

(4')
The power supply device according to (3'), wherein the control unit decreases the number of the second power conditioners to be turned ON when the inputtable power of the first power conditioner being not exceeded is expectable.

(5')
The power supply device according to any of (1') to (4'), wherein a remaining capacity of the power storage unit is a predetermined value or less, supply of power to the specific load is stopped, and the power supply device is transferred to a stand-by mode in which the second power conditioner performs an autonomous operation.

(6')
The power supply device according to any of (1') to (5'), wherein the control unit controls connection between the first path and the AC power path.

(7')
The power supply device according to any of (1') to (6'), wherein the control unit controls the connection between the system power and the AC power path.

(8')
The power supply device according to any of (1') to (7'), wherein, in the stand-by mode, the first and the second power conditioners are turned OFF when generated power of the second power conditioner is smaller than a predetermined value,
the power storage unit is charged when the generated power of the second power conditioner is larger than the predetermined value, and whether the remaining capacity of the power storage unit is larger than a predetermined value is determined, and the supply of power to the specific load is resumed when the remaining capacity of the power storage unit is larger than the predetermined value.

(9')
The power supply device according to any of (1') to (8'), wherein, in the stand-by mode, the power is interrupted when the power of the power storage unit runs out, or a minimum cell voltage of the power storage unit is a discharge stop voltage or less.

(10')
The power supply device according to any of (1') to (9'), wherein the first power conditioner is a bidirectional power conditioner.

(11')
The power supply device according to any of (1') to (10'), wherein the power generation unit is a power generation device using natural energy.

(12')
The power supply device according to any of (1') to (11'), wherein the specific load is a load connected to an autonomous outlet.

(13')
A power supply system including:
system power configured to supply power to a general load system;
an AC power path to which the system power is input, and configured to supply power to a specific load;
a power storage unit;
a first path including a first power conditioner arranged between the power storage unit and the AC power path;
one or a plurality of power generation units;
one or a plurality of second power conditioners capable of being operated by the power storage unit;
a second path including the second power conditioner arranged between the power generation unit and the AC power path; and
a control unit configured to control connection between the second path and the AC power path,
wherein the control unit controls ON/OFF of the second power conditioner according to a power generation output of the power generation unit and power consumption of the specific load when the connection between the system power and the AC power path becomes disconnected.

(14')
A method of controlling power supply, the method including:
system power configured to supply power to a general load system;
an AC power path to which the system power is input, and configured to supply power to a specific load;
a power storage unit;
a first path including a first power conditioner arranged between the power storage unit and the AC power path;
one or a plurality of power generation units;
one or a plurality of second power conditioners capable of being operated by the power storage unit;
a second path including the second power conditioner arranged between the power generation unit and the AC power path; and
a control unit configured to control connection between the second path and the AC power path,
wherein the control unit controls ON/OFF of the second power conditioner according to a power generation output of the power generation unit and power consumption of the specific load when the connection between the system power and the AC power path becomes disconnected.

2. Modification

While embodiments of the present disclosure have been specifically described, the present disclosure is not limited to the above-described embodiments, and various modifications based on the technical idea of the present disclosure can be made. For example, the configurations, methods, processes, shapes, materials, and numerical values described in the embodiments are merely examples, and different configurations, methods, processes, shapes, materials, and numerical values from the examples may be used as needed. For example, one embodiment described above employs a configuration of connecting a plurality of power generation units in parallel. However, a system may be configured from a single power generation unit. Further, connection/disconnection may be switched not only by the switches, but also by ON/OFF of power supplies of connected devices. Further, an electric vehicle (EV) may be connected in place of the storage battery 73.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Power system
3 General load
4 Power storage device
5 and 15 Solar panel
6 and 16 Sunlight power conditioner
17 Autonomous outlet
73 Storage battery 81 Power storage device power conditioner
82 Control unit
84 Bidirectional inverter

The invention claimed is:

1. A power supply control device comprising:
a control unit; and
a power path that is connected to a primary external power system, wherein the power path includes a first connection to provide power to a general load system and a separate second connection to provide power to an autonomous outlet, and
when a connection state between the primary external power system and the power path is in a disconnected state, the control unit is configured to control power output of two or more second power conditioners of two or more corresponding secondary external power generation units, based on
 (a) an amount of power consumption of a specific load connected to the power supply control device through the autonomous outlet, and
 (b) a power generation output of the secondary external power generation unit,
wherein the autonomous outlet is configured to provide power when the connection state between the primary external power system and the power path is in the disconnected state,
wherein two or more second power conditioners are configured to be controlled in synchronization with the primary external power system or an output of a power storage unit that is connected to the control unit,
wherein the control unit is configured to increase the number of the second power conditioners to be turned on when it is estimated that inputtable power of a first power conditioner connected to the power storage unit will not be exceeded, and the control unit is configured to decrease the number of the second power conditioners to be turned on or to turn off all the second power conditioners when it is estimated that inputtable power of a power conditioner connected to the power storage unit will be exceeded, and
wherein, when it is determined that a minimum cell voltage of a storage battery is a discharge stop voltage or less, or power in the storage battery runs out, in a stand-by mode, a power supply state becomes a power supply stop state.

2. The power supply control device according to claim 1, wherein if a remaining capacity of a power storage unit that is connected to the control unit is a predetermined value or less, supply of power to the specific load is stopped, and the power supply control device is transferred to the stand-by mode in which the at least one second power conditioner of a corresponding secondary external power generation unit performs an autonomous operation.

3. The power supply control device according to claim 2, wherein when in the stand-by mode, the second power conditioner of the secondary external power generation unit and a power conditioner connected to the power storage unit are turned off when generated power of the second power conditioner of the secondary external power generation unit is less than a predetermined value, and
wherein the power storage unit is charged when the generated power of the second power conditioner of the secondary external power generation unit is larger than the predetermined value.

4. The power supply control device according to claim 3, wherein when a remaining capacity of the power storage unit is larger than a predetermined value, a supply of power to the specific load is resumed.

5. The power supply control device according to claim 1, wherein a power conditioner connected to the power storage unit is a bidirectional power conditioner including a DC-DC converter and a bidirectional inverter.

6. The power supply control device according to claim 1, wherein at least one secondary external power generation unit is a power generation device using solar energy or wind energy.

7. A power supply control system comprising:
a power supply control device that includes a control unit, and a power path that is connected to a primary external power system, wherein the power path includes a first connection to provide power to a general load system and a separate second connection to provide power to an autonomous outlet; and
a secondary external power generation system that is separate from the primary external power system and that is connected to the power supply control device, the secondary external power generation system including two or more photovoltaic cells and corresponding two or more second photovoltaic power conditioners connected to the photovoltaic cells,
wherein when connection state information indicates that the primary external power system and the power path are in a disconnected state, the control unit is configured to control the power output of the two or more second photovoltaic power conditioners based on
 (a) an amount of power consumption of a specific load connected to the power supply control device through the autonomous outlet, and
 (b) a power generation output of the secondary external power generation system,
wherein the autonomous outlet is configured to provide power when the connection state information indicates that the primary external power system and the power path are in a disconnected state,
wherein two or more second photovoltaic power conditioners are configured to be controlled in synchronization with the primary external power system or an output of a power storage unit that is connected to the control unit,
wherein the control unit is configured to increase the number of the second photovoltaic power conditioners to be turned on when it is estimated that inputtable power of a first power conditioner connected to the power storage unit will not be exceeded, and the control unit is configured to decrease the number of the second photovoltaic power conditioners to be turned on or to turn off all the second photovoltaic power conditioners when it is estimated that inputtable power of a first power conditioner connected to the power storage unit will be exceeded, and
wherein, when it is determined that a minimum cell voltage of a storage battery is a discharge stop voltage or less, or power in the storage battery runs out, in a stand-by mode, a power supply state becomes a power supply stop state.

8. The power supply control system according to claim 7, wherein if a remaining capacity of a power storage unit that is connected to the control unit is a predetermined value or less, supply of power to the specific load is stopped, and the power supply control device is transferred to the stand-by mode in which the at least one second power conditioner of a corresponding secondary external power generation unit performs an autonomous operation.

9. The power supply control system according to claim 8, wherein when in the stand-by mode, the second power conditioner of the secondary external power generation unit and a power conditioner connected to the power storage unit are turned off when generated power of the second power conditioner of the secondary external power generation unit is less than a predetermined value, and wherein the power storage unit is charged when the generated power of the second power conditioner of the secondary external power generation unit is larger than the predetermined value.

10. The power supply control system according to claim 9, wherein when a remaining capacity of the power storage unit is larger than a predetermined value, a supply of power to the specific load is resumed.

11. The power supply control system according to claim 10, wherein a power conditioner connected to the power storage unit is a bidirectional power conditioner including a DC-DC converter and a bidirectional inverter.

12. The power supply control system according to claim 11, wherein at least one secondary external power generation unit is a power generation device using solar energy or wind energy.

13. A method of controlling a power supply of a power supply device, the method comprising:
controlling, when a connection state between a primary external power system and a power path, which includes a first connection to provide power to a general load system and a separate second connection to provide power to an autonomous outlet, is in a disconnected state, power output of two or more second power conditioners of two or more corresponding secondary external power generation units based on
(a) an amount of power consumption of a specific load connected to the power supply control device through the autonomous outlet, and
(b) a power generation output of the secondary external power generation unit,
wherein the autonomous outlet is configured to provide power when the connection state between the primary external power system and the power path is in a disconnected state,
wherein two or more second power conditioners are configured to be controlled in synchronization with the primary external power system or an output of a power storage unit that is connected to the control unit, wherein the control unit is configured to increase the number of the second power conditioners to be turned on when it is estimated that inputtable power of a first power conditioner connected to the power storage unit will not be exceeded, and the control unit is configured to decrease the number of the second power conditioners to be turned on or to turn off all the second power conditioners when it is estimated that inputtable power of a power conditioner connected to the power storage unit will be exceeded, and wherein, when it is determined that a minimum cell voltage of a storage battery is a discharge stop voltage or less, or power in the storage battery runs out, in a stand-by mode, a power supply state becomes a power supply stop state.

14. The method according to claim 13, wherein if a remaining capacity of a power storage unit that is connected to a control unit is a predetermined value or less, supply of power to the specific load is stopped, and the power supply control device is transferred to the stand-by mode in which the at least one second power conditioner of a corresponding secondary external power generation unit performs an autonomous operation.

15. The method according to claim 14,
wherein when in the stand-by mode, the second power conditioner of the secondary external power generation unit and a power conditioner connected to the power storage unit are turned off when generated power of the second power conditioner of the secondary external power generation unit is less than a predetermined value, and wherein the power storage unit is charged when the generated power of the second power conditioner of the secondary external power generation unit is larger than the predetermined value.

16. The method according to claim 15, further comprising resuming a supply of power to the specific load when a remaining capacity of the power storage unit is determined to be larger than a predetermined value.

17. The method according to claim 16, wherein the power conditioner connected to the power storage unit is a bidirectional power conditioner including a DC-DC converter and a bidirectional inverter.

18. The method according to claim 17, wherein at least one secondary external power generation unit is a power generation device using solar energy or wind energy.

* * * * *